R. WOOD.
LUBRICATING APPARATUS.
APPLICATION FILED JAN. 28, 1920.
1,414,610.
Patented May 2, 1922.
3 SHEETS—SHEET 1.
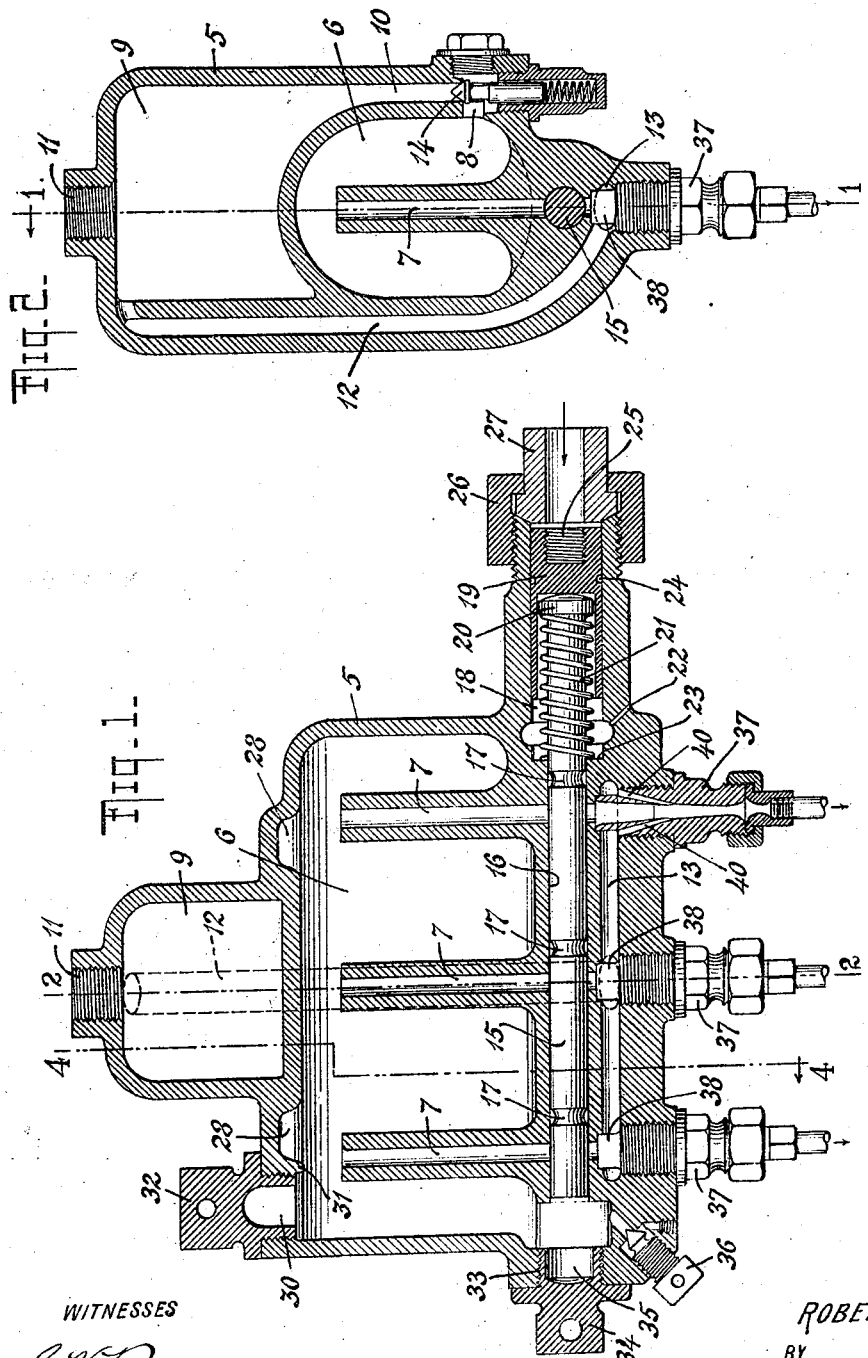
WITNESSES
INVENTOR
ROBERT WOOD
BY
ATTORNEY

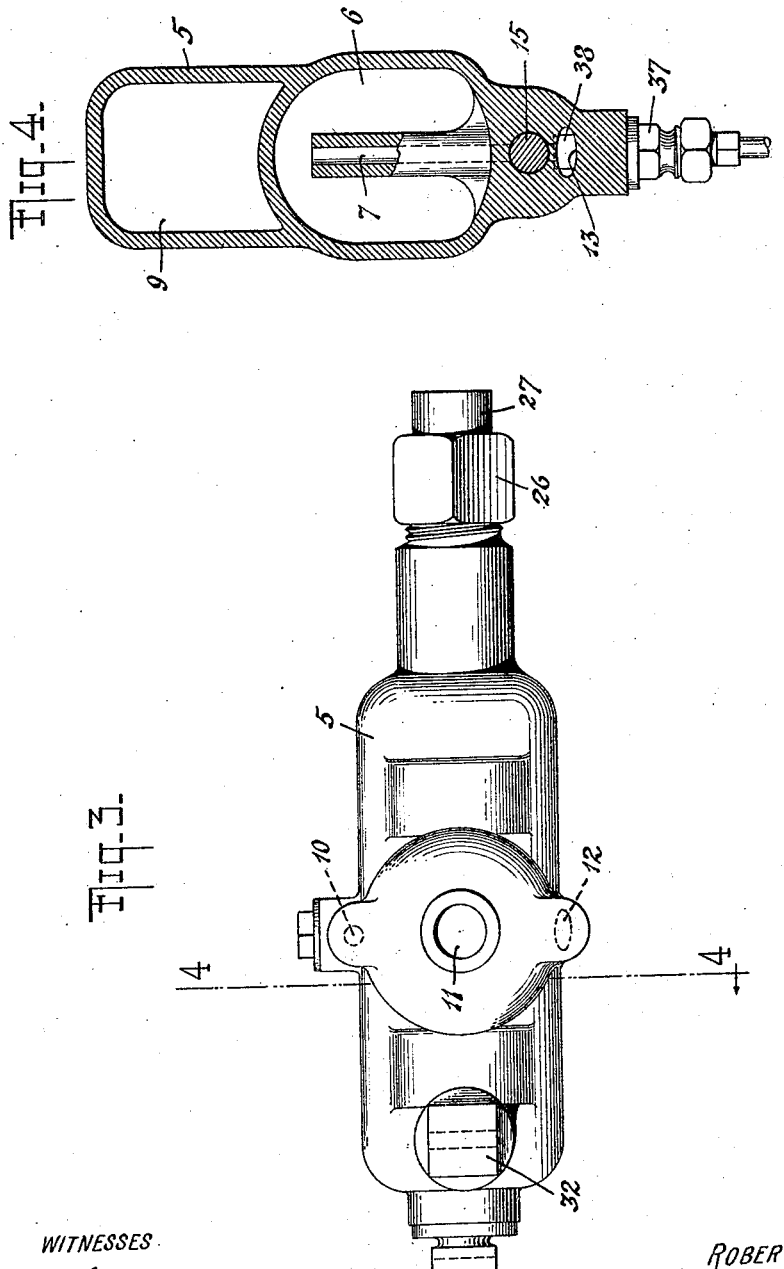

R. WOOD.
LUBRICATING APPARATUS.
APPLICATION FILED JAN. 28, 1920.
1,414,610.
Patented May 2, 1922.
3 SHEETS—SHEET 3.
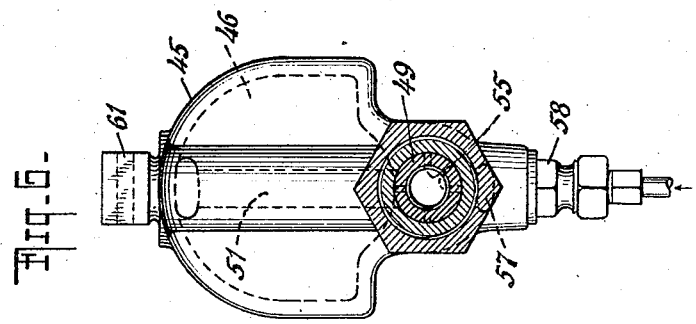
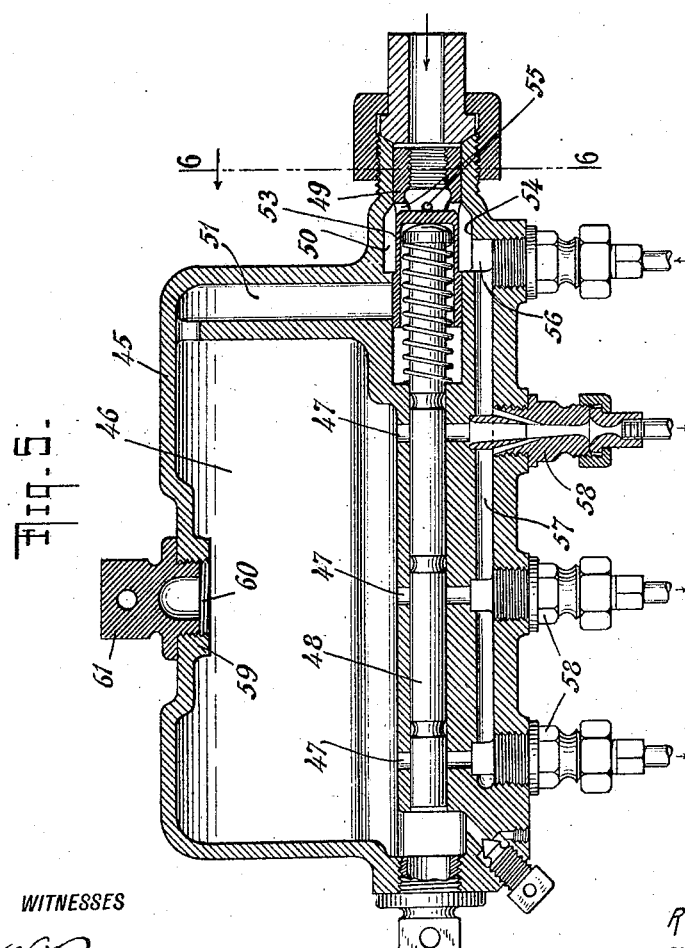
WITNESSES
INVENTOR
ROBERT WOOD
BY
ATTORNEY

UNITED STATES PATENT OFFICE.

ROBERT WOOD, OF BROOKLYN, NEW YORK.

LUBRICATING APPARATUS.

1,414,610.  Specification of Letters Patent.  Patented May 2, 1922.

Application filed January 28, 1920. Serial No. 354,629.

*To all whom it may concern:*

Be it known that I, ROBERT WOOD, a subject of the King of Great Britain, and a resident of 63 Fenimore Street, borough of Brooklyn, county of Kings, city and State of New York, have invented certain new and useful Improvements in Lubricating Apparatus, of which the following is a specification.

The present invention relates to lubricating apparatus and more especially to lubricating apparatus to be used to supply lubrication to regions of pressure as for example to the cylinders of steam engines, air compressors and the like.

The object of the invention is to provide an improved lubricating device, and more particularly a lubricating device adapted to supply lubricant under pressure, and preferably under such conditions that the flow of lubricant can be automatically controlled in accordance with the requirements of use.

The principle of the invention will best be understood from a description of particular apparatus constructed in accordance with and embodying the invention. For the purposes of this specification I have illustrated in the accompanying drawings forming a part hereof, apparatus designed to feed lubricant to the cylinder and valve mechanism of a steam engine.

The apparatus shown is so designed that it may be connected to the cylinder of a steam engine in such manner that the fluctuations of pressure in the cylinder will operate to open and close a valve which controls the flow of lubricant. When the engine is still the valve remains closed. Lubricant will thus be fed only while the engine is running.

In the drawings:

Figure 1 is a central longitudinal sectional view taken on the line 1—1 Fig. 2 of a lubricating device constructed in accordance with the invention.

Fig. 2 is a transverse sectional view taken on the line 2—2 Fig. 1;

Fig. 3 is a top plan view of the device.

Fig. 4 is a transverse sectional view taken on the line 4—4 of Figs. 1 and 3.

Fig. 5 is a central longitudinal section view of another embodiment of the invention; and Fig. 6 is an end elevation partly in transverse section taken on the line 6—6 of Fig. 5.

In the apparatus illustrated in Figs. 1 to 4, the casing 5 is formed to provide a lubricant supply chamber 6 having one or more outlet passages 7, 7, which in use are connected by suitable pipes to the several points at which oil or other lubricant is to be delivered. When the lubricant is to be introduced into the steam supply pipe of a steam engine (or into any region at which pressure is maintained), it is desirable that an appropriate pressure be applied within the lubricant chamber to overcome the effect of the back pressure in the lubricant delivery pipes. This can conveniently be done by connecting the inlet 8 with a source of live steam of sufficient pressure, as, for instance, the boiler. Preferably a condenser is used between the source of steam and the lubricant chamber so that only water enters the lubricant chamber through this connection. In the apparatus illustrated the condenser is made an integral part of the casing 5. As shown the casing is formed to provide a condenser chamber 9, connected at its bottom by a passage 10 with the inlet 8 of the lubricant chamber to permit flow of condensed steam into said lubricant chamber. At the top of the condenser chamber an inlet 11 is provided for connection with the boiler or other source of live steam. A passage 12 formed in the casing leads from a relatively high point of the condenser chamber down along the side of the lubricant chamber and connects with the lubricant outlet passages 7, 7 through an intersecting bore 13.

The outlets 7, 7 lead from the lubricant chamber at a relatively high point so that as the condensed steam gradually fills the chamber displacing the lubricant upwardly, a supply of lubricant will be maintained about said outlets. These outlets may be formed as shown by upstanding vertical tubes in the center of the casing.

The water inlet 8 is controlled by a one way check valve 14 of usual construction arranged to permit flow only into the lubricant chamber. On the forward stroke of the ram this valve automatically closes.

The lubricant outlets are controlled by a plunger 15 constituting a valve member reciprocably mounted in a horizontal bore 16 constituting a slideway and plunger chamber, which bore intersects the outlet passages 7, 7, at the lower portion of the casing. The plunger 15 is provided with peripheral grooves 17 which are arranged to move to and from a position coinciding with the outlet passages during reciprocation. The reciprocating plunger operates also to increase and decrease the pressure in the chamber, acting as a force pump, and thus constitutes a force pump feature of the invention. The arrangement of the grooves 17 is such that the discharge of lubricant occurs during the period of increased pressure in the chamber while the combined valve member and plunger is at or near its innermost position. The width and depth of each of the grooves 17 will be determined by the amount of lubricant to be fed through the corresponding outlet. Obviously the different grooves of the plunger may differ in width and depth to provide for a feed of different amounts of lubricant to different parts if necessary or desirable. In the construction illustrated in the drawings the arrangement is such that the outlet passages are closed when the plunger is in its extreme innermost position and the grooves 17 register with the outlet passages to permit flow of lubricant only while the plunger or valve is approaching and leaving such extreme position. This arrangement is preferred for the reason that the valve is thus not likely to stop in open position and thereby permit complete discharge of the lubricant. Obviously this arrangement may be altered to suit the requirements of use under varying conditions, as for example to provide a constant feed through one of the outlets.

The combined valve member and plunger may be operated by any suitable means. When the device is connected to supply lubricant to an engine cylinder it is preferably operated automatically in synchronism with the engine piston. This may conveniently be done, for instance, by a pressure connection. As shown, the outer end of the bore (at the right in Fig. 1) is enlarged to provide, in effect, a cylinder 18. A piston 19, slidably mounted in this cylinder is connected to actuate the plunger 15. The area of the end of this piston is substantially greater than the area of the inner end of the plunger so that the pressure upon the piston overcomes the pressure in the lubricant chamber acting against the inner end of the plunger. A small vent 22 is provided to permit the escape of any condensed steam or oil which may collect in the cylinder 18. As shown the piston 19 is bored at its inner end to receive the headed end 20 of the plunger. The pressure within the lubricant chamber will act to return the plunger to its outermost position when the pressure on the piston is released but I prefer to provide a spring 21 compressed between the head 20 and an opposite shoulder 23 of the casing to insure return movement and improve the operation of the valve. A groove 24 in the piston provides a water seal between the piston and cylinder wall. The piston 19 is shown as provided with a tapped hole 25 at its outer end to facilitate removal for cleaning or repair. At its outer end the cylinder is provided with a suitable union 26 and tail piece 27 to afford pipe connection with the engine cylinder or other region of fluctuating pressure in order that the piston may be suitably operated.

I prefer to provide means to insure a free flow of the lubricant from the device to the parts to be lubricated. This is accomplished by admitting steam to the lubricant conveying ducts at a suitable point. In the construction shown in Figs. 1 to 4 steam is admitted to the outlets 7 through the passage 12 and bore 13. The steam thus admitted heats the lubricant conduits and maintains the lubricant in a free flowing condition. The flowing steam also mechanically carries the lubricant forward.

The arrangement illustrated is such that an excess of steam constantly passes through the condenser and to the lubricant conduits thus insuring a sufficient supply to the condenser as well as to the lubricant conduits.

It will be understood that in operation the condensation of steam in the condenser chamber will exceed the flow of condensed steam into the lubricant chamber. The surplus water will overflow and be carried along with the steam through the passage 12 to the bore 13 and through the outlet passages 7, 7 and pipes connected therewith.

It is one of the features of the invention that the apparatus is maintained in heated condition at or near the temperature of the steam by the live steam and hot water of condensation which is always present in the condenser chamber and connecting passages. One of the advantages of this artificial heating is the uniformity of operation of the device under different weather conditions.

In order to relieve and equalize the strains in operation and otherwise to improve the operation of the apparatus, I provide expansion pockets 28 at the top of the lubricant chamber so arranged that they will serve as air cushions when the chamber is filled with lubricant.

The filling opening 30 is separated from the adjacent air pocket 28 by a depending flange 31 to insure the trapping of air when the lubricant chamber is filled. A suitable plug 32 closes the filling opening. A plugged opening 33 is shown in line with the plunger to facilitate boring of the slideway and assembling of the plunger. As shown the plug 34 which closes the opening 33 is provided with a recess 35 into which the end of the plunger extends when in its projected position thus providing necessary clearance. A drain plug 36 is provided at the lowest point of the lubricant chambers to permit the lubricant or water to be stops the feed of lubricant stops. In operation, steam will be constantly condensing and mixing with the lubricant or settling by gravity down through the lubricant and will be fed therewith. The mixture of lubricant and water as fed is probably in the nature of an emulsion due to the manner of condensation and the jar of the engine. A constant temperature is maintained under all weather conditions due to the presence of the steam thus insuring uniformity of action under varying conditions.

It will be obvious that the present invention provides a radical departure from the prior art by providing a novel combination of the desirable features of two different types of lubrication, the hydrostatic and the force feed lubricators. The device is simple in construction and operation with few parts while providing a positive feed and certainty of operation.

The apparatus illustrated in the accompanying drawings has been described more particularly with regard to its application to steam engines, for the purposes of this specification, but it is to be understood that the invention is capable of application to engines of other types and to machines other than engines as will be well understood by those skilled in the art. This is especially true of apparatus embodying principles of the construction illustrated in Figs. 5 and 6.

Various changes in the specific forms shown and described may be made without departing from the spirit of my invention as defined in the claims.

I claim:

1. A lubricating device of the character described, comprising a casing formed with a lubricant chamber, a plunger chamber in permanent communication at one end with said lubricant chamber, an outlet leading from said lubricant chamber across the plunger chamber, a plunger movable in said plunger chamber to increase or decrease the pressure within the lubricant chamber, said plunger also acting as a valve controlling said outlet.

2. A lubricating device of the character described comprising a casing formed with a lubricant chamber, a plunger chamber in permanent communication at one end with said lubricant chamber, an outlet leading from said lubricant chamber, a plunger movable in said plunger chamber to increase or decrease the pressure within the lubricant chamber, said plunger also acting as a valve controlling said outlet.

3. A lubricating device of the character described comprising a casing formed with a lubricant chamber, a plunger chamber in permanent communication at one end with said lubricant chamber, an outlet leading from said lubricant chamber, means connected with said lubricant chamber to supply thereto a fluid medium under pressure, and a plunger movable in said plunger chamber to increase or decrease the pressure within the lubricant chamber, said plunger also acting as a valve controlling said outlet.

4. A lubricating device of the character described comprising a casing formed with a lubricant chamber having a lubricant outlet, means connected with said lubricant chamber to supply thereto a fluid medium under pressure, and a solid member movable to exert additional pressure on the lubricant contained in said chamber.

5. A lubricating device of the character described, comprising a casing formed with a lubricant chamber having a lubricant outlet, means connected with said lubricant chamber to supply thereto a fluid medium under pressure, and a member movable to increase or decrease the effective volume of the lubricant chamber and thereby decrease or increase respectively the pressure within said chamber.

6. A lubricating device comprising a casing having a lubricant chamber with an outlet therefrom, and a combined valve and plunger in the casing which alone controls said outlet and which is operative to cause an increase of pressure in the chamber when the outlet is open.

7. A lubricating device having a lubricant supply chamber with an outlet therefrom, a combined valve and plunger in the casing controlling said outlet, a piston associated with said combined valve and plunger, connections by which fluid under pressure can be admitted against said piston whereby as pressure is applied against said piston the plunger will be shifted to open the outlet and substantially simultaneously the pressure in the lubricant chamber will be increased by the plunger.

8. A lubricating device of the character described comprising a casing having a lubricant chamber or reservoir with an outlet adapted to be connected with a part to be lubricated and an inlet adapted to receive fluid under pressure arranged to be connected to a region of fluctuating pressure, a valve and plunger movably mounted in said casing constructed and arranged to open and close said outlet and operative to cause an increase of pressure in said chamber for the discharge of lubricant through said outlet.

9. A lubricating device for steam engines comprising a casing having a lubricant chamber provided with a plurality of outlets and a slideway adjacent to said outlets, a plunger slidable in said slideway and operating in said chamber, to increase the pressure in the chamber from the normal working pressure of the chamber to a predeterdrained from the chamber when necessary.

I prefer to provide nozzles in the outlets 7, 7 at the point of intersection with the bore 13, so constructed and arranged that they will act somewhat after the manner of an injector to create a suction to draw the lubricant down the outlet passages and expel it with greater velocity along through the conducting pipes. As shown nipples 37 are provided with extensions 38 at their upper ends which extend across the bore 13 and into recesses surrounding the outlet passages 7. The bore of the nipple thus forms in effect a continuation of the passage 7. Small holes 40 extend from the shoulder of the nipple diagonally into the central bore. In operation steam passes through these diagonal passages and through the bore creating a suction which aids the effect of the force pump action of the plunger. These nipples or nozzles also serve to lead the lubricant downwardly across the bore 13 and prevent its flowing along the bore.

The apparatus shown in Figs. 5 and 6 is generally similar to that shown in Figs. 1 to 4 but it is modified to provide for the introduction of live steam, or a non-condensing fluid, instead of condensed steam, into the lubricant supply chamber. It comprises a casing 45 having a lubricant chamber 46 with one or more outlets 47. A combined valve and plunger 48 generally similar to that shown in Figs. 1 to 4 controls the lubricant outlet passages. The plunger is actuated by a piston 49 reciprocably mounted in a cylinder 50. The outlets 47 open into the lower portion of the lubricant chamber instead of into the upper portion for the reason that in this apparatus the level of the lubricant gradually lowers in use instead of being maintained at the top of the casing as in the apparatus shown in Figs. 1 to 4 and for the reason that there is not the accumulation of water that is found in the apparatus of Figs. 1 to 4.

It is contemplated that this apparatus can be used in a manner to feed a mixture of condensed steam and oil in a more or less emulsified condition for it is sometimes desirable to feed water with oil or to feed an emulsion of oil and water for lubricating purposes. In this construction the steam inlet into the lubricant chamber may be associated with the connection through which the plunger 48 is operated thus dispensing with a separate connection such as found in the apparatus shown in Figs. 1 to 4. As shown, a passage 51 at the end of the casing enters the chamber 46 at the top thereof and is connected with the cylinder 50.

The piston 49 which, so far as its relation to the plunger is concerned, is similar to the piston of Figs. 1 to 4 is formed to act as a valve to control the flow of steam through the passage 51 to the lubricant chamber. As shown in Fig. 5 the piston and cylinder walls are annularly recessed as indicated at 53 and 54 to provide a steam passage. Passages 55 through the piston permit flow of steam from behind the steam piston to the annular steam passage.

The admission of steam or other fluid through the passages 55 in the piston and along the piston into the lubricant chamber may be relied upon to provide the necessary pressure in the lubricant chamber if the sizes of the various passages and the timing of the piston valve are properly adjusted. I prefer, however, to provide a separate connection, as for instance from the steam boiler which shall better insure the maintainance of pressure in the lubricant chamber. As shown in Fig. 5 such a connection is indicated at 56. This connection provides for the admission of live steam around the piston so that as the piston is in its forward position (toward the left in Fig. 5) steam will enter the lubricant chamber through the passage 51. The connection 56 renders the passages 55 through the piston unnecessary but they are preferably provided to permit a slight flow of steam therethrough for circulation. These passages 55 should be made very small when the connection 56 is provided to prevent too great a flow of steam therethrough.

Means for insuring free flow of the lubricant in the conduits is preferably provided as in the construction first described. As shown a bore 57 intersects the several lubricant outlet passages and connects with the inlet 56. An excess of steam is thus constantly supplied. Nozzle outlet nipples 58 similar to the nipples 37 are provided for the same purpose as in the first described construction.

An expansion pocket is provided at the top of the lubricant chamber by so arranging the filling opening that the chamber cannot be entirely filled with lubricant. As shown, a defending flange 59 is provided around the filling opening 60 for this purpose. A plug 61 closes the filling opening.

In the operation of the apparatus when used to lubricate the cylinder of a steam engine, live steam is supplied to the cylinder to actuate the piston 49, as for example, by providing a pipe connection from the engine cylinder. Whenever pressure is applied to the cylinder 50 to actuate the plunger, the passage 51 will be opened and steam will enter the lubricant chamber 46 creating a pressure therein. Such pressure will be increased by the force pump action of the plunger. As the plunger moves to position to open the outlets lubricant and condensed steam will be fed. By this arrangement the feed is automatically controlled by the engine and when the engine mined maximum during its movement in one direction and to reduce the pressure again to such normal working pressure during its movement in the opposite direction.

10. A lubricating device comprising a casing having a lubricant supply chamber with an inlet adapted to be connected with a source of fluid under pressure an outlet leading from the upper portion of said chamber, a valve member movable in the casing to open and close the outlet and having a portion operating in the chamber to cause increase and decrease of pressure therein associated with the opening and closing of the outlet.

11. A lubricating device comprising a casing having a lubricant chamber with an inlet arranged to be connected to a source of liquid under pressure, a valve having a portion constituting a plunger movable in the casing, to open and close said outlet and to increase and decrease the pressure in said chamber, and connections for connecting said valve for operation simultaneously and automatically with a piston to be lubricated by said device.

12. A lubricating device of the character described comprising a casing having a lubricant supply chamber provided at its top with an inverted open pocket portion forming an air trap and having an outlet, a valve member having a portion constituting a plunger operative to open and close said outlet and to increase and decrease the pressure in said chamber, whereby a discharge at increased pressure is caused.

13. A lubricating device of the character described comprising a casing having a lubricant supply chamber with an inlet adapted to be connected with a source of fluid under pressure, and having a lubrication outlet a valve member controlling said outlet and having a portion constituting a plunger arranged to cause an increase of pressure in the chamber substantially simultaneously with the opening of the outlet and means for connecting said valve member to an engine cylinder, to be operated by the fluctuation of pressure in said cylinder whereby the feed of lubricant will be proportionate to the engine speed.

14. A lubricating device of the character described comprising a casing having a lubricant supply chamber with an inlet adapted to be connected to admit fluid under pressure to said chamber and having an outlet adapted to be connected to a part to be lubricated, a valve member controlling the outlet to open and close the same and having a plunger forming a rigid part thereof arranged to cause the lubricant to be discharged at an increased pressure when the outlet is open.

15. A lubricating device of the character described comprising a casing having a lubricant supply chamber having an outlet and an inlet, a valve arranged to open and close said outlet and having a portion constituting a plunger adapted to cause an increase and decrease of pressure in said chamber substantially simultaneously with the opening and closing of the outlet and means under control of a fluctuating pressure actuating said valve.

16. A lubricating device of the character described comprising a casing formed with a lubricant chamber, a condenser chamber communicating therewith and a plunger chamber in permanent communication at one end with said lubricant chamber, an outlet leading from said lubricant chamber, a plunger movable in said plunger chamber to increase and decrease the pressure within the lubricant chamber, said plunger also acting as a valve controlling said outlet, a steam passage connecting the top portion of said condenser chamber to said outlet passage at a point beyond the plunger.

17. A lubricating device of the character described comprising a casing formed with a lubricant chamber having a lubricant outlet and a condenser chamber in communication therewith, means connecting said condenser chamber to supply thereto a fluid medium under pressure, a one way valve controlling the communicating passage between the condenser and lubricant chamber arranged to permit flow from the condenser chamber to the lubricant chamber only and a member movable to increase or decrease the effective volume of the lubricant chamber and thereby to decrease or increase respectively the pressure within said chamber.

18. A lubricating device comprising a casing having a lubricant chamber with an outlet therefrom, a combined valve and plunger in the casing to control said outlet and operative to apply pressure in the chamber, a connection for conducting lubricant from said outlet and means for introducing steam into said connection to aid the flow of lubricant through said connection.

19. The lubricating device comprising a casing having a lubricant chamber with an outlet therefrom, a combined valve and plunger in the casing to control said outlet and operative to apply pressure in the chamber, an ejector nozzle connected with said outlet and connections for supplying steam to said ejector nozzle to create a suction to draw lubricant from said outlet and to expel it with greater velocity.

20. A lubricating device comprising a casing having a lubricant chamber with an inlet for a fluid medium under pressure and a lubricant outlet, means comprising a plunger arranged to control said inlet and said outlet operative to admit fluid medium under pressure temporarily to increase the pressure of the lubricant at the outlet while said outlet is open, said plunger having connections for operation from a region of fluctuating pressure, substantially as and for the purpose described and having connection for operation from a region of fluctuating pressure.

21. A lubricating device of the character described having in combination a lubricant chamber having outlets, a plunger and valve mechanism for automatically controlling said outlets and causing periodically an increase of pressure in said chamber and means for supplying water under pressure to said lubricant chamber.

22. A lubricating device of the character described having in combination a lubricant chamber having an inlet and outlets, a plunger and valve mechanism for automatically controlling said outlets and causing periodically an increase of pressure in said chamber, means for supplying water under pressure to said lubricant chamber and means for sealing said inlet during the periodical increase of pressure, whereby lubricant is expelled under the increased pressure.

23. A lubricating device of the character described having in combination a lubricant chamber having inlets and outlets, a plunger and valve mechanism for automatically controlling said outlets and causing periodically increase and decrease of pressure in said chamber, means for supplying water under pressure to said lubricant chamber during the decrease of pressure and means for sealing said inlet during the increase of pressure whereby lubricant is expelled under pressure during the period of increased pressure and water is admitted during the period of decreased pressure.

In testimony whereof I have hereunto set my hand.

ROBERT WOOD.